United States Patent Office 3,464,791
Patented Sept. 2, 1969

3,464,791
PROCESS FOR THE PRODUCTION OF PIGMENTARY TiO₂
Walter Twist, Hartlepool, England, assignor to British Titan Products Company Limited, Billingham, England, a corporation of Great Britain
No Drawing. Filed June 16, 1967, Ser. No. 646,457
Claims priority, application Great Britain, Aug. 26, 1966, 38,299/66
Int. Cl. C01g 23/04; C09c 1/36
U.S. Cl. 23—202          14 Claims

ABSTRACT OF THE DISCLOSURE

A process for the production of pigmentary titanium dioxide comprising preparing an aqueous titanium sulphate solution, nucleating this solution and subjecting it to thermal hydrolysis to precipitate hydrous titanium dioxide wherein the conditions of hydrolysis are controlled to provide a substantially constant rate of precipitation of hydrous titanium dioxide for at least 60% of the hydrolysis while maintaining the rate of precipitation throughout the process below 1.2% per minute.

---

The present invention relates to an improved process for the production of titanium dioxide, particularly pigmentary titanium dioxide.

Pigmentary titanium dioxide is commonly produced by the "sulphate" process in which an iron-containing titaniferous material, for example ilmenite or a titaniferous slag derived therefrom, is digested with concentrated sulphuric acid; the resulting cake is lixiviated with water or dilute acid; the iron in the resulting solution is reduced to the ferrous state; the solution is clarified and usually some ferrous iron is removed, for example by crystallisation. The resulting aqueous solution of titanium sulphate (having acceptable iron/titanium and acid/titanium ratios) is then usually seeded with anatase- or rutile-inducing nuclei, as required, and subjected to thermal hydrolysis to precipitate hydrous titanium dioxide.

The hydrous titanium dioxide may then be recovered, washed, leached (usually in the presence of trivalent titanium) and additioned with precalcination additions, as desired, and calcined. After calcination the material is generally subjected to a number of treatments such as washing, milling, hydroclassification, coating and/or additional milling to develop more fully the pigmentary properties of the material.

It has been found that such a process may not produce a pigment having the optimum brightness and tone which can be obtained.

It is an object of the present invention to provide a similar process whereby pigments of improved brightness and tone may be obtained.

Accordingly, the present invention is a process for the production of pigmentary titanium dioxide comprising preparing an aqueous acidic titanium sulphate solution, nucleating the solution and subjecting it to thermal hydrolysis to precipitate hydrous titanium dioxide characterised in that the conditions of hydrolysis are controlled to provide a substantially constant rate of precipitation of hydrous titanium dioxide for at least 60% of the time of hydrolysis while maintaining the rate of precipitation throughout the process below 1.2% per minute; as TiO₂ on the titanium (expressed as TiO₂) in the initial solution.

Generally the substantially constant rate of precipitation will be maintained for at least 75% of the time of hydrolysis and preferably this constant rate is maintained throughout the process since improved results may thereby be obtained.

The aqueous acidic titanium sulphate solution may be prepared in any suitable manner but is preferably prepared in the same manner as are such solutions in the normal sulphate process, i.e., by the digestion of ilmenite or a titaniferous slag derived therefrom in concentrated sulphuric acid at elevated temperatures followed by lixiviation of the resulting cake with water or dilute sulphuric acid.

Before using such solutions in the process of the present invention they are preferably contacted with a reducing agent, for example scrap iron, to ensure that substantially all the iron is in the ferrous state, and clarified by the flocculation of suspended impurities and decantation, filtration or by the use of a centrifuge.

In some cases, particularly where the iron content is high (as in the case of titanium sulphate solutions prepared by the digestion of ilmenite), it may be desirable to remove some iron (as ferrous sulphate) by crystallisation after cooling and/or concentration.

It is preferred that the titanium sulphate solutions to be used in the process of the present invention shall have a titanium concentration (expressed as $TiO_2$) in the range 70 g./litre to 300 g./litre and particularly one of the range 100 g./litre to 230 g./litre; an iron/titanium ratio (expressed as Fe and $TiO_2$) not greater than 1.0 and particularly not greater than 0.5, and an acid/titanium ratio in the range 1.26 to 2.2 and particularly one in the range 1.6 to 2.0. (The acid/titanium ratio referred to above is the ratio of free acid together with that associated with titanium to titanium (expressed as $TiO_2$).)

When a suitable titanium sulphate solution has been obtained this is seeded with an appropriate quantity of nuclei.

The preferred method of obtaining such nuclei is by the thermal hydrolysis of an aqueous solution of titanium tetrachloride under carefully controlled conditions. As is well known the nuclei may be rutile- or anatase-inducing depending upon the exact method of preparation.

Although the present process is applicable to the production of both anatase and rutile pigments, seeding with rutile-inducing nuclei to give rutile pigments is preferred.

Where the nuclei are prepared externally, for example from aqueous titanium tetrachloride solutions, it is preferred to add a quantity (expressed as $TiO_2$) equivalent to between 0.2% and 5% of the titanium (expressed as $TiO_2$) in the titanium sulphate solution and particularly an amount in the range 0.5% to 2.0%.

It has been found that the brightness and tone of pigmentary titanium dioxide prepared by the sulphate process from a given starting material is determined primarily by the rate of precipitation of the hydrous titanium dioxide during the thermal hydrolysis of the titanium sulphate solution and that a slower rate of precipitation favours the production of brighter pigment of better tone.

In previously used processes the thermal hydrolysis of the titanium solution is carried out by heating the solution to a substantially constant temperature (except for changes in temperature which are due to variations in concentration which take place during the thermal hydrolysis), which is usually at or about the boiling point of the liquor.

The amount of hydrous titanium dioxide precipitated under these conditions when plotted against time follows a sigmoid curve, i.e., one in which there is an initial slow rate of precipitation followed by a period at a much more rapid, and finally a period of slower, rate of precipitation. During the latter period the point at which complete hydrolysis occurs is asymptotically approached.

The rate of precipitation in such a process may vary throughout by a factor of about 5 and it is clear that where the rate of precipitation is the main factor in obtaining pigment of high brightness and tone, a period of very rapid precipitation during the process has a deleterious effect upon the final pigment.

It has also been found that at least the maximum rate of precipitation of hydrous titanium dioxide during thermal hydrolysis by previously used processes is very much higher for unconcentrated liquors, i.e., solutions containing, for example, less than about 180 g./litre of titanium (expressed as $TiO_2$) when derived from ilmenite and less than about 220 g./litre when derived from slag, than for such liquors which have been concentrated before thermal hydrolysis.

It will be apparent, therefore, from what has been said previously that pigments of poorer brightness and tone will be produced from the thermal hydrolysis of unconcentrated liquors, when compared with pigments produced from similar liquors which have been concentrated, by the previously used methods of thermal hydrolysis, i.e., by hydrolysis at substantially constant temperature.

One method by which a rapid rate of precipitation of hydrous titanium dioxide might be avoided is by carrying out the thermal hydrolysis according to the previously used methods at such a temperature that the *maximum* rate of precipitation, i.e., that represented by the midpart of the sigmoid curve is sufficiently slow to give pigments of acceptable brightness and tone. Such a method would, however, require an excessively long period of thermal hydrolysis which would be unacceptable in the large scale production of $TiO_2$ pigment.

These difficulties are overcome in the process of the present invention by the adjustment of the conditions during thermal hydrolysis whereby the slow initial and final rates of precipitation are increased and the maximum rate of precipitation is generally reduced thereby giving a substantially constant rate of precipitation over at least the greater part of the process, particularly over at least 60%, generally over at least 75% of the cycle and preferably throughout the whole process. By this means an acceptably slow rate of precipitation can be used, i.e., one which gives a pigment of good brightness and tone, without the necessity for an excessively long period of thermal hydrolysis.

It has been found, in any case, that the rate of precipitation should be maintained below about 1.2% per minute and preferably at a rate in the range 0.3% to 0.8% per minute throughout the process.

The most convenient method for maintaining a substantially constant rate of precipitation throughout the hydrolysis is by varying the temperature of liquor. Thus, where the rate of precipitation is slower than required the temperature is increased and as the rate of precipitation increases the temperature is progressively decreased to maintain the desired rate of precipitation and when this again begins to fall off the temperature is again progressively increased to maintain the precipitation rate until the process has reached the desired efficiency (which should be at least 90%).

Where the liquor is unconcentrated the process can be carried out at temperatures which are not in excess of the boiling point of the liquor at atmospheric pressure. Concentrated liqors may, however, require at some stage in the process thermal hydrolysis temperatures in excess of the boiling point of the liquor under atmospheric pressure to achieve an acceptable constant rate of precipitation and this will, of course, require special equipment such as pressure vessels and the like.

It is believed that one of the main precipitation rate-controlling factors is the viscosity of the liquor and the rate of precipitation may be controlled by adjusting the viscosity of the liquor during precipitation, for example by the addition of a viscosity-modifying chemical(s), at the appropriate stages.

It is also possible to assist to some extent in the control of the rate of precipitation by modifying the nuclei added to the liquor, for example by the addition of a nuclei-modifying chemical during the formation of the nuclei.

The variations in temperature of the liquor during thermal hydrolysis can be readily determined by experiment or theoretically from the kinetics of the reaction. For example a hydrolysis of the liquor to be used may be carried out under conventional and previously used conditions, e.g., at substantially constant temperature and the liquor sampled at predetermined times throughout the hydrolysis to determine the amount of precipitated titanium dioxide present. From the graph obtained by plotting the amount of precipitated hydrous titanium dioxide against time, variations in rate of precipitation can be found and appropriate temperature corrections can then be determined and applied to succeeding precipitations from similar liquors to give the desired substantially constant rate of precipitation.

In the following examples, Example 1 describes a method for carrying out the process of the present invention from titanium sulphate liquor prepared from a titaniferous slag; Examples 2, 3 and 4 show the process when applied to liquors obtained from ilmenite. In the former, hydrolysis is carried out in such a manner as to provide two different but substantially constant rates of precipitation during the process and in the two latter examples the rate of precipitation is maintained substantially constant throughout the process.

EXAMPLE 1

A titaniferous slag was digested with concentrated sulphuric acid to give a digestion cake which was lixiviated to give a titanium sulphate-containing liquor, the suspended impurities were flocculated and the supernatant liquor decanted off to give a clarified liquor having the following characteristics:

Titanium concentration (expressed as $TiO_2$)
g./litre__ 206
Acid/titanium ratio _____ 1.77
Iron/titanium ratio _____ 0.16
Specific gravity (at 20° C.) _____ 1.525

This liquor was rapidly heated in a vessel to a temperature of 95° C. and 1.8% nuclei (expressed as $TiO_2$ on the titanium in the liquor, also expressed as $TiO_2$) added.

The nuclei were rutile-inducing and were prepared by the thermal hydrolysis of an aqueous titanium tetrachloride solution after partial neutralisation with sodium hydroxide. The nuclei consisted of an aqueous suspension containing 30 g. $TiO_2$/litre.

The temperature was then rapidly raised to 105° C. before being reduced over a period of 50 minutes at a substantially constant rate to 92° C. and during the next 20 minutes to 90.5° C., after which it was again raised over the next 20 minutes to 91° C. It was then raised at a substantially constant rate over the next 100 minutes to a final temperature of 102° C.

During this period the rate of precipitation of hydrous titanium dioxide (expressed as $TiO_2$) was substantially constant at 0.5%/minute.

The efficiency of the hydrolysis was 94%. The hydrous titanium dioxide was recovered by filtration, washed, leached, rewashed and then additioned with potassium (0.27% as $K_2O$), zinc (0.25% as ZnO) and phosphate (to give a total concentration in the material of 0.2% as $P_2O_5$) in the usual manner and the additioned product was calcined for 2½ hours in a furnace at 830° C. The product had a rutile content, after this treatment, of 98%.

The pigment had a dry brightness when visually estimated by an experienced operator of 5½ and a neutral tone. A product prepared from the same slag by a conventional thermal hydrolysis wherein the liquor was boiled for a similar period of time had a much inferior brightness of 7 and a brown tone.

EXAMPLE 2

An ilmenite was digested with concentrated sulphuric acid to give a digestion cake. This was lixiviated to produce titanium sulphate-containing liquor which was contacted with iron to ensure that all the iron present was in the ferrous state; the suspended impurities flocculated, the supernatant liquor decanted off and some ferrous sulphate crystallised out to give a clarified liquor having the following characteristics:

| | |
|---|---|
| Titanium concentration (expressed as $TiO_2$) g./litre | 167 |
| Acid/titanium ratio | 1.90 |
| Iron/titanium ratio | 0.40 |
| Specific gravity (at 60° C.) | 1.491 |

The liquor was rapidly heated to 92° C. and 1.8% nuclei (prepared as described in Example 1) were added. The temperature of the liquor was then reduced at a constant rate over the next 80 minutes to 85° C. and thereafter over the next 20 minutes to 84.5° C. It was then raised at a constant rate to 85.2° C. over a period of 20 minutes and thereafter to 97° C. over the following 100 minutes, at which time the precipitation was substantially complete.

The rate of precipitation over the first 80 minutes was substantially constant at 0.3%/minute and over the next 140 minutes at 0.5%/minute.

The hydrous titanium dioxide precipitated was separated off, washed, leached, rewashed and additioned as described in Example 1 and calcined at 865° C. to give a pigmentary product containing 98.2% rutile and having a dry brightness of 5 with a neutral tone. The product from the hydrolysis of this ilmenite by conventional processes normally has a brightness in excess of 6.

EXAMPLE 3

An ilmenite was digested; the digestion cake lixiviated and the resulting titanium sulphate solution clarified and crystallised as described in Example 2.

The titanium sulphate solution thus produced had similar characteristics to that described in Example 2 but had a slightly higher specific gravity of 1.520.

The solution was rapidly heated to 92° C. and 1.8% nuclei added (prepared as in Examples 1 and 2).

The temperature was then lowered at a substantially constant rate over the next 100 minutes to 84° C. and then raised to 87.4° C. over the next 50 minutes. It was finally raised to 95° C. over the next 50 minutes, after which the precipitation was substantially complete.

During the hydrolysis the rate of precipitation remained substantially constant at 0.4%/minute.

After washing, leaching, rewashing and additioning and calcining (as described in Example 2) the product had a brightness of 5 with a clean, slightly yellow, tone and consisted of 98.2% rutile.

EXAMPLE 4

A process similar to that described in Example 3 was carried out, again using ilmenite as the starting material.

The titanyl sulphate solution formed, after digestion, lixiviation, reduction, clarification and removal of some ferrous sulphate by crystallisation, had the following properties:

| | |
|---|---|
| Titanium concentration (expressed as $TiO_2$) g./litre | 159 |
| Acid/titanium ratio | 1.90 |
| Iron/titanium ratio | 0.42 |

The liquor was rapidly heated to 95° C. and 1.8% nuclei (prepared as in the previous examples) added. The rapid heating was continued to 102° C. at which the precipitation cycle commenced.

Over the next 40 minutes the temperature was lowered at a substantially constant rate to 90° C. and to 87° C. over the next 40 minutes. The temperature was then raised to 93° C. over the next 80 minutes and finally to 99° C. over the next 40 minutes.

The percentage $TiO_2$ precipitated over this cycle was 20% (after 40 minutes); 40% (after 80 minutes); 61% (after 120 minutes); 81.5% (after 160 minutes) and the precipitation was substantially complete after 200 minutes.

The precipitation took place at a constant rate of 0.5%/minute throughout the cycle and the product, when treated as described in the previous examples, had a brightness of 5½ and a neutral colour.

Pigmentary $TiO_2$ prepared in a similar manner by a conventional process, i.e., by boiling the liquor throughout the precipitation had a brightness in excess of 6 with a yellow tone.

What is claimed is:

1. In a process for the production of pigmentary titanium dioxide comprising preparing an aqueous acidic titanium sulphate solution, nucleating the solution and subjecting it to thermal hydrolysis to precipitate hydrous titanium dioxide, the improvement which comprises varying the temperature of the solution in a controlled manner during hydrolysis to provide a substantially constant rate of precipitation of hydrous titanium dioxide for at least 75% of the time of hydrolysis while maintaining the rate of precipitation throughout the whole process below 1.2% per minute, as $TiO_2$ on the titanium (expressed at $TiO_2$) in the initial solution, said controlled manner comprising increasing said temperature when said precipitation rate tends to become substantially slower than said constant rate and decreasing said temperature when said precipitation rate tends to increase substantially beyond said constant rate.

2. A process as claimed in claim 1 wherein the substantially constant rate of precipitation is maintained throughout the process.

3. A process as claimed in claim 1 wherein the aqueous acidic titanium sulphate solution is prepared by digesting a material selected from the group consisting of ilmenite and a titaniferous slag derived therefrom in concentrated sulphuric acid at an elevated temperature and thereafter lixiviating the resulting cake with a material selected from the group consisting of water or dilute sulphuric acid.

4. A process as claimed in claim 1 wherein the aqueous acidic titanium sulphate solution has a titanium concentration (expressed as $TiO_2$) in the range 70 to 300 g./litre.

5. A process as claimed in claim 4 wherein the titanium concentration is in the range 100 to 230 g./litre.

6. A process as claimed in claim 1 wherein the aqueous acidic titanium sulphate solution has an iron/titanium ratio (expressed as FeO and $TiO_2$) not greater than 1.

7. A process as claimed in claim 6 wherein the iron-titanium ratio is not greater than 0.5

8. A process as claimed in claim 1 wherein the aqueous acidic titanium sulphate solution has an acid/titanium ratio in the range 1.26 to 2.2.

9. A process as claimd in claim 8 wherein the acid/titanium ratio is in the range 1.6 to 2.0.

10. A process as claimed in claim 1 wherein the aqueous acidic titanium sulphate solution is nucleated with externally produced nuclei.

11. A process as claimed in claim 10 wherein the amount of nuclei (expressed as $TiO_2$) is added in the range 0.2% to 0.5% of the titanium (expressed as $TiO_2$) in the solution.

12. A process as claimed in claim 11 wherein the amount of nuclei added is in the range 0.5% to 2.0%.

13. A process as claimed in claim 1 wherein the aqueous acidic titanium sulphate solution is nucleated with rutile-inducing nuclei.

14. A process as claimed in claim 1 wherein the rate of precipitation throughout the process is maintained in the range 0.3% to 0.8% per minute.

References Cited

UNITED STATES PATENTS

| | | | |
|---|---|---|---|
| 1,795,467 | 3/1931 | Blumenfeld | 23—202 |
| 2,361,987 | 11/1944 | Booge et al. | 23—202 |
| 2,368,591 | 1/1945 | Dahlstrom | 23—117 |
| 2,452,390 | 10/1948 | Olson | 23—202 |
| 2,503,692 | 4/1950 | Tanner | 23—202 |
| 2,531,926 | 11/1950 | Todd et al. | 23—202 |
| 2,850,357 | 9/1958 | Myers et al. | 23—117 |
| 3,091,515 | 5/1963 | Dantro et al. | 23—202 |
| 3,211,528 | 10/1965 | Wigginton | 23—202 |
| 3,341,291 | 9/1967 | Mabbs et al. | 23—202 |

FOREIGN PATENTS 447,744    5/1936    Great Britain.

OTHER REFERENCES

"Titanium," book by Jelks Barksdale, 1949 edition, pages 176, 177, 183–185, and 187–191. The Ronald Press Co., New York.

EDWARD STERN, Primary Examiner

U.S. Cl. X.R.

23—117; 106—300